United States Patent [19]

Tanabe et al.

[11] Patent Number: 4,744,621
[45] Date of Patent: May 17, 1988

[54] CONNECTOR HOUSING FOR AN OPTICAL FIBER CABLE

[75] Inventors: Takashi Tanabe; Koya Komatsu, both of Tokyo, Japan

[73] Assignee: NEC Corporation, Tokyo, Japan

[21] Appl. No.: 44,052

[22] Filed: Apr. 29, 1987

[30] Foreign Application Priority Data

May 2, 1986 [JP] Japan .................................. 61-101193

[51] Int. Cl.$^4$ .............................................. G02B 6/36
[52] U.S. Cl. ................................. 350/96.20; 350/96.21
[58] Field of Search .............. 350/96.10, 96.20, 96.21, 350/96.22

[56] References Cited

U.S. PATENT DOCUMENTS 4,422,716 12/1983 Morimoto et al. ............... 350/96.21
4,690,494 11/1987 Hirose et al. ................. 350/96.21 X Primary Examiner—William L. Sikes
Assistant Examiner—Akm E. Ullah
Attorney, Agent, or Firm—Leydig, Voit & Mayer

[57] ABSTRACT

An improved connector housing comprises an outer and inner housing members and a snap ring to be positioned in grooves formed on the respective inner and outer surfaces of the outer and inner housing members. The snap ring is made of a resilient metal strip and is shaped to have at least one convex portion along the longitudinal direction thereof so that a resilient compressing force is produced to increase a screw fixing force between the outer housing member and an adapter when the inner housing member is moved in relation to the outer housing member.

3 Claims, 4 Drawing Sheets

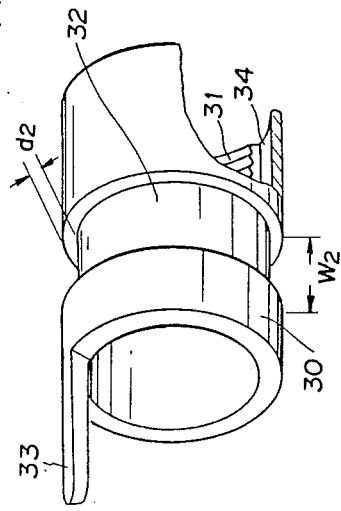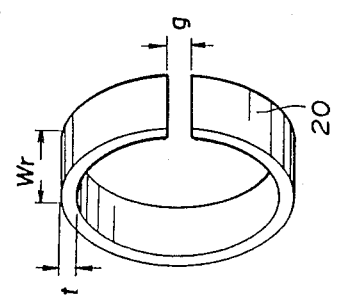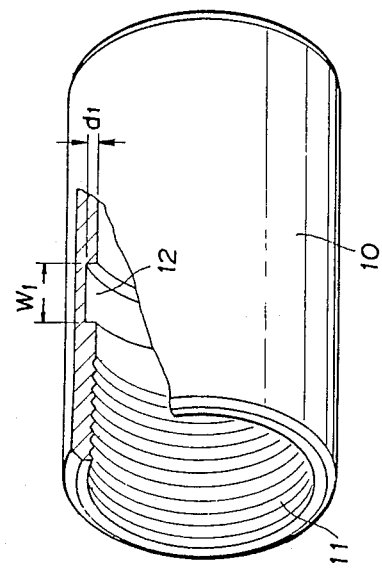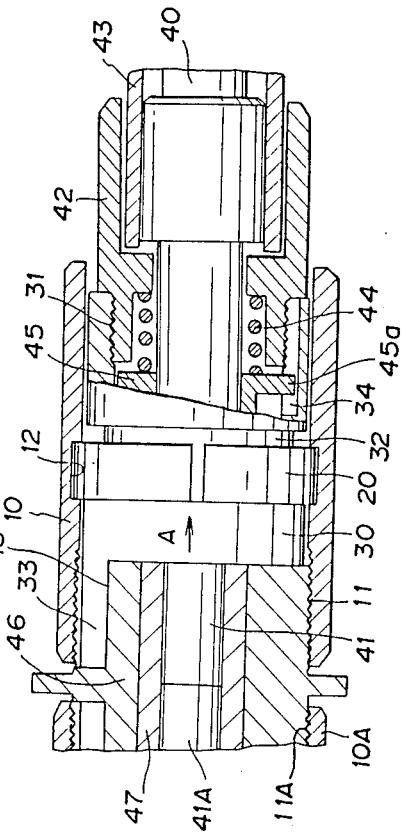

4,744,621

CONNECTOR HOUSING FOR AN OPTICAL FIBER CABLE

FIELD OF THE INVENTION

The invention relates to a connector housing for an optical fiber cable, and more particularly to a connector housing for an optical fiber cable to one end of which one end of an adapter is coupled with a higher screw fixing force thereby resulting in a stable connection between optical fiber cables or between an optical fiber cable and optical system for a long time.

BACKGROUND OF THE INVENTION

One of conventional connector housings for an optical fiber cable has been described in the U.S. Pat. No. 4,422,716 which was issued on Dec. 27, 1983. The connector housing for an optical fiber cable comprises an outer and inner housing members which are coaxialy positioned, and a snap ring to be inserted between grooves which are formed on the corresponding inner and outer surfaces of the outer and inner housing members. The outer housing member is provided at one end on the inner surface with a screw thread into which there is inserted an adapter to support a ferrule for accomodating the terminating portion of an optical fiber therein, and the inner housing member is provided at one end on the inner surface opposite to the end of the outer housing member with a screw thread into which there is inserted a housing sleeve placed through a rubber sleeve over an optical fiber cable which is connected with the other optical fiber cable, while the snap ring is made of a resilient metal strip which is circular to have a gap between both ends.

In operation of connecting a pair of optical fiber cables by use of a connector housing mentioned above, a pair of the connector housings and an adapter are prepared. In one of the connector housing, the housing sleeve for the optical fiber cable is fixed to the inner housing member in accordance with the coupling of the screw thread thereof. Next, the ferrule of the optical fiber cable is inserted at the tip portion thereof into the adapter, while the outer housing member is rotated to be coupled with the adapter in accordance with the coupling of the screw thread thereof. Under the situation where the outer housing member is being coupled with the adapter, the inner housing member is pushed axially by the adpter so that the snap ring is also pushed from one side on which the adapter is positioned to the direction in which the optical fiber cable is positioned by the side wall of the groove of the inner housing member and is stopped on the other side by colliding with the side wall of the groove of the outer housing member. As a result, a resilient repulsion force is produced in the snap ring thereby to be applied to the coupling portion of the screw threads between the outer housing member and adapter so that the screw fixing force is increased therein. In the same manner as described above, the remaining connector housing is coupled on the other side of the adapter therewith and to a housing sleeve for the remaining optical fiber cable so that the pair of the optical fiber cables are interconnected.

In the conventional connector housing, however, a screw fixing force as expected is not obtained between the adapter and outer housing member for the reason why the resilient repulsion force of the snap ring is limited in its level because the resilient deformation is small due to the configuration thereof. As a result, there is resulted in less reliability in the connection of optical fiber cables.

On the other hand, if there is adopted a spring member which produces much larger resilient force, operation of connecting optical fiber cables becomes difficult to be performed and a connector housing becomes larger in its size.

SUMMARY OF THE INVENTION

Accordingly, it is an object of the invention to provide a connector housing for an optical fiber cable to one end of which one end of an adaptor is coupled with a higher screw fixing force thereby resulting in a stable connection between optical fiber cables or between an optical fiber cable and optical system for a long time.

It is a further object of the invention to provide a connector housing or an optical fiber cable by which operation in connecting between optical fiber cables or between an optical fiber cable and optical system are easy to be performed.

According to the invention, a connector housing comprises, an outer housing member which is provided at one end on the inner surface thereof with a screw thread for receiving one end of an adapter and at an approximately center position on the inner surface thereof with a predetermined width and depth of a groove, an inner housing member which is coaxially positioned in said outer housing member and which is provided at one end on the inner surface thereof opposite to said one end of said outer housing member with a screw thread for receiving one end of a housing sleeve to be placed over an optical fiber cable and at a position on the outer surface thereof corresponding to said approximately center position of said outer housing member with a predetermined width and depth of a groove, and a snap ring which is made of a resilient metal strip to be formed with at least one convex portion along the longitudinal direction thereof, wherein said predetermined width of said groove of said outer housing member is equal to or more than a dimension in the addition of the width of said snap ring to the height of said convex portion, while said predetermined depth of said groove of said outer housing member is less than the thickness of said snap ring, and said predetermined width of said groove of said inner housing member is equal to or more than said dimension in said addition, while said predetermined depth of said groove of said inner housing member is equal to or more than the thickness of said snap ring, said snap ring being shaped circular to have a predetermined gap at facing ends opposite to each other and positioned in said grooves of said outer and inner housing members whereby said inner housing member to which said housing sleeve is coupled through said screw thread at said opposite end on the inner surface thereof is pushed in the direction towards said opposite end by said adapter which is coupled through said screw thread provided at said one end on the inner surface of said outer housing member with said outer housing member so that said snap ring in said grooves of said outer and inner housing member is resiliently compressed.

BRIEF DESCRIPTION OF THE DRAWINGS

The invention will be explained in more detail in accordance with following drawings wherein, FIGS. 1A to 1C are perspective views illustrating an outer housing member, snap ring and inner housing member in a conventional connector housing, FIG. 2 is a partial cross sectional view illustrating the conventional connector housing.

DESCRIPTION OF THE PREFERRED EMBODIMENT

Figure 3A:
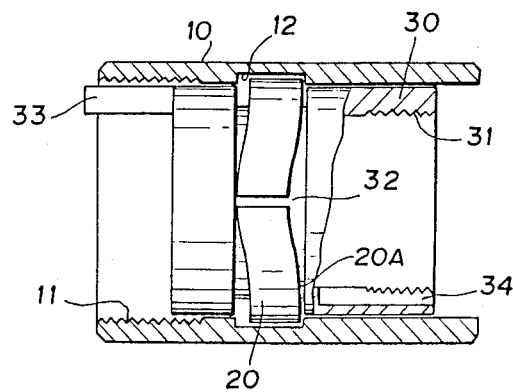
FIGS. 3A and 3B are a partial cross sectional view and perspective view which is partially cut respectively illustrating an embodiment of a connector housing according to the invention.

Before describing a preferred embodiment according to the invention, a conventional connector housing mentioned briefly before will be explained in more detail.

In FIGS. 1A to 1C, there are shown an outer housing member 10, snap ring 20 and inner housing member 30 which are to be assembled to compose a connector housing. The outer housing member 10 is of a cylindrical shape and is provided at one end on the inner surface thereof with a screw thread 11 for receiving one end of an adapter to be described later and at a center position on the inner surface thereof with a groove 12 having the width $W_1$ and depth $d_2$. The snap ring 20 is made of a resilient metal strip having the width Wr and thickness t and is shaped to be circular as shown in FIG. 1B. In the snap ring 20, further, the outer diameter thereof is slightly larger than the inner diameter of the outer housing member 10, while the inner diameter thereof is slightly larger than the outer diameter of the groove 32 of the inner housing member 30, and there is provided a gap g at opposite ends to allow the compression thereof in the radius direction. Finally, the inner housing member 30 is also of a cylindrical shape to be positioned coaxially in the outer housing member 10 and is provided at an end on the inner surface thereof opposite to the end at which the screw thread 11 is provided in the outer housing member 10 with a screw thread 31, at a position corresponding to the groove 12 of the outer housing member 10 with a groove 32 having the width $W_2$ and depth $d_2$, and at the other side thereof with an elongated portion 33 to be described later. In the inner housing member, further, there is provided a slit 34 with which a stopper is engaged as described later. In regard to the dimension of each portion described above, the following relations are satisfied with each other.

In the groove 12, $$W_1 \geq W_r \tag{1}$$

$$d_1 < t \tag{2}$$

In the groove 32, $$W_2 > W_r \tag{3}$$

$$d_2 > t \tag{4}$$

In FIG. 2, there are further shown an optical fiber cable 40 having a ferrule 41 for supporting an optical fiber (not shown) therein at the terminating portion thereof, a housing sleeve 42 to be coupled through the screw thread 31 with the inner housing member 30, a rubber sleeve 43 to be placed over the optical fiber cable 40, a spring coil 44 provided between the housing sleeve 42 and a stopper 45 which is fixed to the ferrule 41 at a position apart from the termination thereof to be engaged with the slit 34, and an adapter 46 having a sleeve 47 into which the ferrule 41 is inserted and having a slit 48 into which the elongated portion 33 of the inner housing member 30 is inserted. The adapter 46 is coupled at one end thereof through the screw thread 11 with the outer housing member 10, while the ferrule 41 is inserted into the sleeve 47 of the adapter 46. In the same manner as mentioned now, the adapter 46 is coupled at the other end thereof through the other screw thread 11A with the other outer housing member 10A, while the other ferrule 41A is inserted into the sleeve 47 of the adapter 46.

In assembling a connector housing mentioned above, there is placed the snap ring 30 into the groove 32 of the inner housing member 30, and then, the inner housing member 30 is inserted into the outer housing member 10 under the condition where the snap ring 30 is compressed to be passed inside the outer housing member 10 so that the resilient compressing force thereof is partly or wholly released in the radius direction when the grooves 32 of the inner housing member 30 comes to the position of the groove 12 of the outer, housing member 10. In this manner, the assembly of a connector housing is finished.

In the connector housing thus assembled, the optical fiber cable 40 on which the housing sleeve 42, rubber sleeve 43 and stopper 45 are provided is inserted into the inner housing member 30 so that the stopper 45 is engaged through a projecting portion 45a with the slit 34. Under this condition, the housing sleeve 42 is rotated to be coupled through the screw thread 31 with the inner housing member 30, while the optical fiber cable 40 is prevented from being rotated due to the engagement of the projecting portion 45a with the slit 34. After the coupling between the inner housing member 30 and optical fiber cable 40, the ferrule 41 of the optical fiber cable 40 is inserted into the sleeve 47 of the adapter 46. Then, the outer housing member 10 is rotated to be coupled through the screw thread 11 with the adapter 46, while the inner housing member 30 is prevented from being rotated due to the insertion of the elongated portion 33 thereof into the slit 48 of the adapter 46. Under this condition, the inner housing member 30 is being pushed in the direction of an arrow A by the adapter 46 so that the snap ring 20 is pushed on one side by a wall of the groove 32 and stopped on the other side by a wall of the groove 12 so that a resilient deforming force is produced in the snap ring 20 to be applied through the inner housing member 30 to the adapter 46. Consequently, a screw fixing force is given to the screw thread 11 so that the coupling force between the outer housing member 10 and adapter 46 is increased.

Next, a preferred embodiment according to the invention will be explained as follows.

Figure 3B:
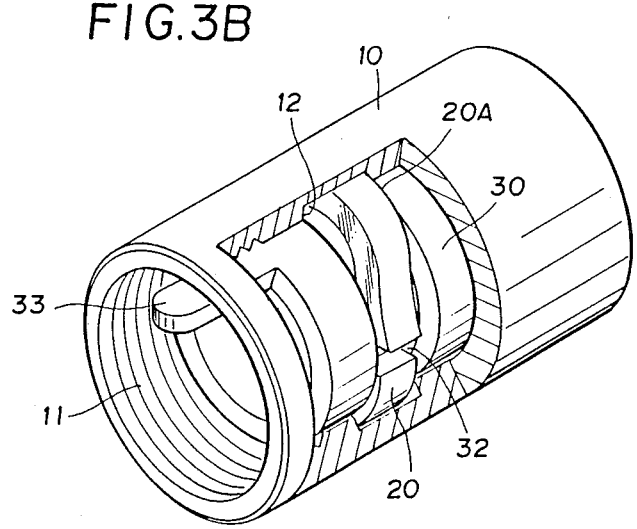
Figure 4:
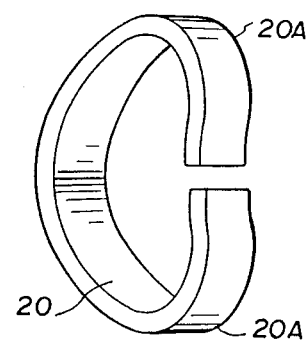
FIG. 4 is a perspective view illustrating a snap ring in the embodiment of a connector housing according to the invention.
Figure 5:
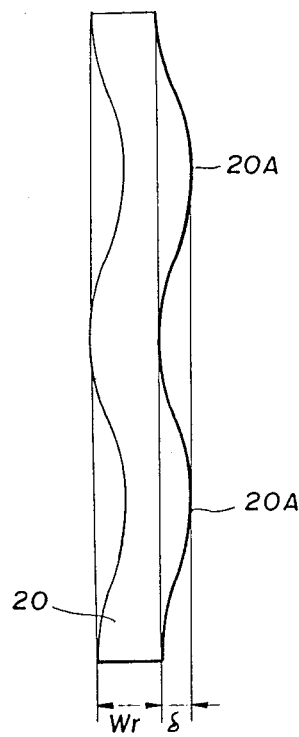
FIG. 5 is an explanatory view which is developed for illustrating the snap ring in FIG. 4.

In FIGS. 3A and 3B, there is shown a connector housing in a embodiment according to the invention which has been already assembled. In the connector housing, like parts are designed by like reference numerals in FIGS. 1A to 1C, and FIG. 2. As clearly understood from the illustration therein, the connector housing comprises an outer housing member 10, snap ring 20, and inner housing member 30. The outer and inner housing member 10 and 30 are mostly of the same structure as the conventional one except that grooves 12 and 32 thereof are wider than the conventional one, while the depth thereof is the same as the conventional one for the reason to be described later. On the other hand, the snap ring 20 is shaped to have two convex portions 20A as shown in FIGS. 4 and 5 in which the width thereof is Wr and the protruding dimension of the convex portion 20A is δ, while the thickness thereof is not necessary to be changed as compared to the conventional snap ring. Accordingly, the width of the grooves 12 and 32 is designed to be equal to or more than a dimension (Wr+δ) in the addition of the width Wr and convex portion 20A.

Figure 6:
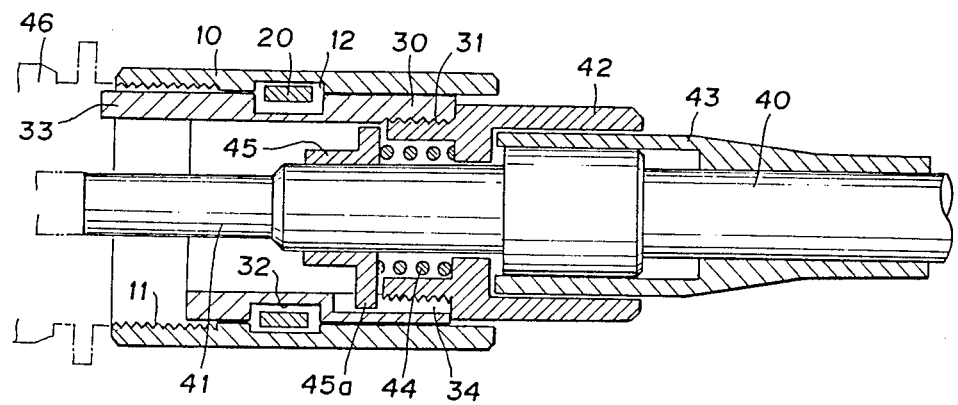
FIG. 6 is a cross sectional view illustrating a connector housing in the embodiment which is applied to a connection between a pair of optical fiber cables.

In FIG. 6, there is shown an optical fiber cable 40 in which ferrule 41 thereof is inserted into an adapter 46 illustrated by a dotted line. In addition, a housing sleeve 42 which is provided through a rubber sleeve 43 over the optical fiber cable 40 is coupled through a screw thread 31 with the inner housing member 30. In the remaining construction therein, like parts are designated by like reference numerals in FIG. 2.

Figure 7:
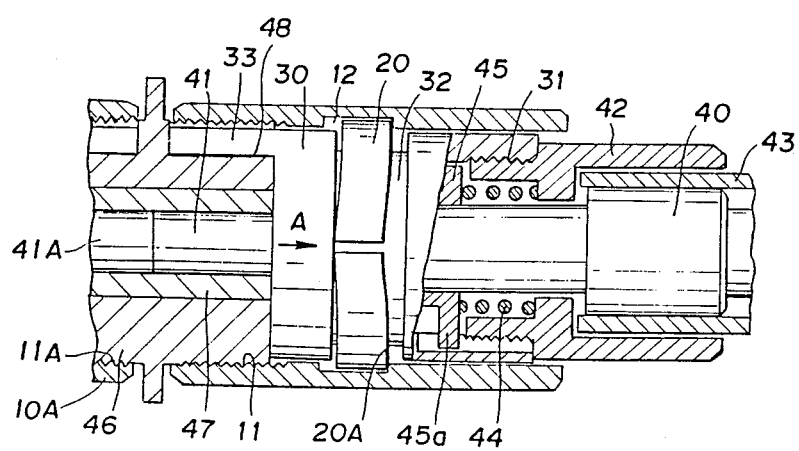
FIG. 7 is a partial cross sectional view illustrating a connector housing in the first embodiment in which a snap ring is compressed.

Under the condition illustrated in FIG. 6, the outer housing member 10 is rotated to be coupled through a screw thread 11 with the adapter 46 as shown in FIG. 7, while the inner housing member 30 is prevented from being rotated due to the insertion of an elongated portion 33 thereof into a slit 48 of the adapter 46. Accordingly, the inner housing member 30 is pushed in the direction A by the adapter 46 so that the snap ring 20 is pushed on one side by a wall of the groove 32 and stopped on the other side to move in the direction A by a wall of the groove 12. In other words, the convex portions 20A of the snap ring 20 collide with the wall of the groove 12 thereby being stopped to move in the direction A, although the snap ring 20 is forced to move in the direction A by the wall of the groove 32 so that the snap ring 20 is compressed axially thereby producing a resilient repulsion force therein which is applied to the inner housing member 30 and then to the adapter 46. Consequently, the screw fixing force between the outer housing member 10 and adapter 46 is extremely increased as compared to the conventional one so that a connection between a pair of optical fiber cables or between an optical fiber cable and optical system is stabilized for a long time.

Figure 8:
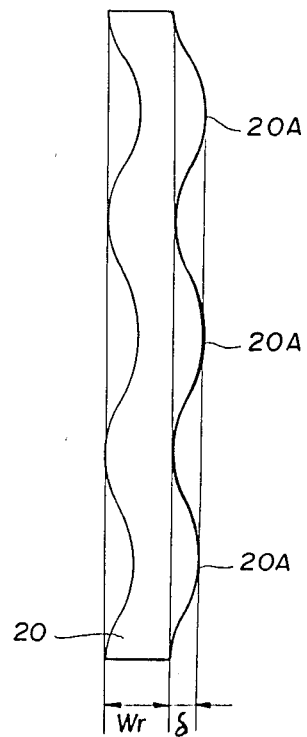
FIG. 8 is an explanatory view which is developed for illustrating another example of a snap ring in the invention.

FIG. 8 shows another example of a snap ring 20 which is provided with three convex portions 20A so that a resilient compressing force is further increased.

Although the invention has been described with respect to specific embodiments for complete and clear disclosure, the appended claims are not to thus limited but are to be construed as embodying all modification and alternative constructions that may occur to one skilled in the art which fairly fall within the basic teaching herein set forth.

What is claimed is:

1. A connector housing for an optical fiber cable comprising,
    an outer housing member which is provided at one end on the inner surface thereof with a screw thread for receiving one end of an adapter and at an approximately center position on the inner surface thereof with a predetermined width and depth of a groove,
    an inner housing member which is coaxially positioned in said outer housing member and which is provided at one end on the inner surface thereof opposite to said one end of said outer housing member with a screw thread for receiving one end of a housing sleeve to be placed over an optical fiber cable and at a position on the outer surface thereof corresponding to said approximately center position of said outer housing member with a predetermined width and depth of a groove, and
    a snap ring which is made of a resilient metal strip to be formed with at least one convex portion along the longitudinal direction thereof,
    wherein said predetermined width of said groove of said outer housing member is equal to or more than a dimension in the addition of the width of said snap ring to the height of said convex portion, while said predetermined depth of said groove of said outer housing member is less than the thickness of said snap ring, and said predetermined width of said groove of said inner housing member is equal to or more than said dimension in said addition, while said predetermined depth of said groove of said inner housing member is equal to or more than the thickness of said snap ring, said snap ring being shaped circular to have a predetermined gap at facing ends opposite to each other and positioned in said grooves of said outer and inner housing members whereby said inner housing member to which said housing sleeve is coupled through said screw thread at said opposite end on the inner surface thereof is pushed in the direction towards said opposite end by said adaptor which is coupled through said screw thread provided at said one end on the inner surface of said outer housing member with said outer housing member so that said snap ring in said grooves of said outer and inner housing members is resiliently compressed.

2. A connector housing for an optical fiber cable according to claim 1,
    wherein said snap ring is provided along the longitudinal direction thereof with a plurality of convex portions.

3. A connector housing for an optical fiber cable according to claim 1,
    wherein said inner housing member is provided at a portion of said screw thread with a slit into which a protruding portion of a stopper provided on an optical fiber cable is inserted and on the other side thereof with an elongated portion to be inserted into a slit of said adapter.

* * * * *